Figure 1:
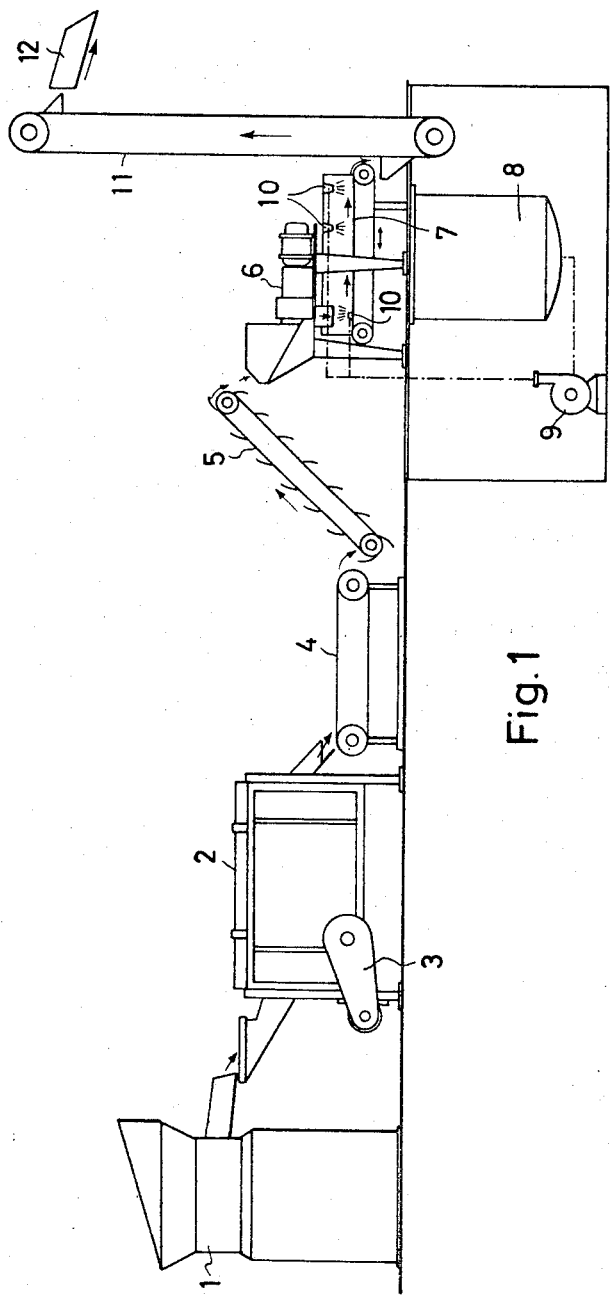

March 18, 1969 E. A. HEIN 3,433,668
METHOD OF RECOVERING STARCH FROM PLANT MATERIALS
Filed May 17, 1966 Sheet 1 of 3

INVENTOR.
Erhard Arnim Hein
BY Kelman and Berman
Agents

United States Patent Office 3,433,668
Patented Mar. 18, 1969

3,433,668
METHOD OF RECOVERING STARCH FROM PLANT MATERIALS
Erhard Armin Hein, Gartenstrasse 85,
Tubingen, Germany
Filed May 17, 1966, Ser. No. 550,687
Claims priority, application Germany, May 18, 1965,
H 56,087
U.S. Cl. 127—67                   13 Claims
Int. Cl. C13l 1/00

This invention relates to recovery of starch from plant materials, and particularly to the recovery of substantially pure starch and flour mainly consisting of starch from plant material containing much water such as tubers, roots, and fruits.

Typical materials with the processing of which this invention is concerned are roots of Manihot utilissima or cassava Jerusalem artichokes, potatoes, sweet potatoes, yams, arrowroot, colocasia, turnips, red beets, carrots, and bananas. These plant materials, as harvested, are characterized by a starch content of generally 3 to 48 percent, by a water content of generally 35 to 95 percent, and by relatively large dimensions of individual pieces so that the ratio of surface area to volume is generally very much smaller than one square centimeter per cubic centimeter.

The starch bearing plant portions which serve as raw materials in the method of this invention are further characterized by other constituents dissolved or colloidally dispersed in the water, and forming therewith plant juices the exact composition of which is not yet known in most cases. The plant juices contain nitrogenous constituents such as albuminoid and proteid materials, but also enzymes, particularly oxidase. Gummy and mucilagenous constituents are frequently encountered.

In a typical conventional process for recovering starch or fluor, mainly consisting of starch, from Manihot roots, the roots are peeled, and converted to pulp in a rasping machine which breaks the cell walls. The juice is extracted from the pulp in a press, and the residue is dried in heated rotating drums and ground.

Jerusalem artichokes or sweet potatoes are usually peeled and sliced, and the slices are dried in thin layers in the sun or in an oven. It is necessary to wash the slices repeatedly during the drying process in order to remove the plant juices and the gummy and mucilaginous constituents thereof from the cut surfaces. They would otherwise clog the pores in the material and the openings formed in the cut cells, and interfere with evaporation of the water. Because of the need for repeated washing, the drying process described may take several days. The dried slices are ground, and fibrous constituents are removed to some extent by sifting. Reasonably complete removal of the fibrous fraction is impossible because the starch and the fibers are adhesively fastened to each other by the gummy and mucilagenous juice constitutents.

Minerals, vitamins, soluble protein, color, and aroma are largely lost during conventional drying with a corresponding loss of food value for human consumption. Starch cannot be recovered from the flour so produced unless large amounts of water free from impurities, particularly iron, are available for processing. If such water is not available at the plant at which the flour was produced, the flour must be transported to a suitable location. Even with an ample supply of suitable water, a portion of the starch remains attached to the fibers by gummy constituents, and goes to waste with the same. The most modern starch plants cannot recover more than 77% of the starch originally present in the crude roots or tubers.

A primary object of the invention is the recovery of substantially all the starch originally present in plant materials of the type described.

The flour produced from tropical plants by the aforedescribed known methods cannot be stored for reasonable periods in the climate in which the plants grow. The fluor deteriorates because of fermentation and attack by fungi and insects, mainly on constituents other than starch.

Another object of the invention is the provision of a method for recovering starch from the afore-described plant materials which does not require a supply of pure water for manufacture of a product which may safely be stored under adverse climatic conditions.

A further object of the invention is to provide a method for the manufacture of starch which makes it unnecessary to peel root materials and the like, and which permits the starch content of peels and similar heretofore wasted plant parts to be recovered.

I have found that these objects can be achieved, and that the limitations of the known processes can be overcome by maintaining a critically important ratio between the surface area and the volume of the pieces of plant material in the drying process. Highest yields are obtained by precipitating the colloidally dispersed gummy and mucilagenous constituents from the plant juice before the starch-bearing plant material is dried, and before the walls of most of the cells are broken. The precipitation or coagulation of the colloidal material can be brought about by adjusting the pH of the cell content toward the isoelectric point of the albuminoid and similar constituents or by breaking the dispersion or emulsion thereof by electrolytes in a manner well known in itself. Ultrasonic vibrations, electrophoresis, and electrostatic fields may also be employed for the same purpose in a manner well known in itself.

Mechanical devices, conventional in themselves, are employed for cutting the unpeeled plant material into pieces having an adequate surface area for outward diffusion of water during drying, yet keeping most of the original cell structure intact to avoid bleeding of the plant juices. I have found that a very satisfactory compromise between these inherently contradictory requirements is reached when the plant material is cut into cubes having sides approximately 0.5 to 2 centimeters long, or corresponding other shapes in which the ratio of surface area to volume is between approximate limits of 12 and 3 square centimeters per cubic centimeter. Best results are obtained under many conditions with cubes having a side length of 0.8 to one centimeter and a corresponding surface to volume ratio between approximately 7.5:1 and 6:1. Adequate results under favorable circumstances may be obtained, however, with a ratio as low as one square centimeter per cubic centimeter. The yield and the quality of the product are sharply lower outside the range of one to 12 square centimeters per cubic centimeter.

The only pretreatment piror to cutting may consist in washing of the plant material to remove gross contamination. Peeling is unnecessary and to be avoided because it is usually wasteful of recoverable starch values.

The freshly cut surfaces are preferably contacted with an aquous coagulant solution. Acid coagulants not only break the dispersons, but also inactivate the oxidase and other enzymes which limit the storage life of conventionally manufactured flours. The coagulent solution thus may be an aqueous solution of any acid in an amount sufficient to make the pH of the cell contents approximately 5.

Since small amounts of the acid may remain in the finished product, non-toxic acids are selected when the product is intended for direct consumption by men or animals. No special requirements apply in the manufacture of starch for industrial purposes. Formic acid, benzoic acid, lactic acid, sorbic acid are preferred for food products, but other organic acids such as butyric acid, adipic acid, glycolic acid, pyruvic acid, the several mono-, di- and trihaloacetic acids, more specifically the chloro- and bromoacetic acids, oxalic acid, and tartaric acid, and inorganic acids are generally applicable in corresponding concentrations of about 0.2 to 0.5 percent by weight.

Small residual amounts of benzoic acid retained in the ultimate product prevent spoilage as is well known, and other acids which are suitable coagulating agents have similar effects.

Electrolytes other than acids may be employed as coagulating agents in a manner well known in itself. The soluble halides and complex halides of the alkali and alkaline earth metals are typical of the neutral electrolytes suitable for this purpose. Sodium chloride, potassium chloride, the several sodium phosphates, sodium fluosilicate, and calcium chloride may be used on an industrial scale in the method of the invention. The halides and sulfates of multivalent metals are suitable coagulants, for example, ferric chloride and aluminum chloride, but numerous other flocculating and coagulating agents fully familiar to those skilled in the art of water purification may be employed if their presence in the starch product is not objectionable.

The coarsely cut plant material may be dipped in the coagulent solution, but excellent results have been obtained by merely spraying the cut pieces from all sides with a fine mist of the acid or other coagulant solution until the freshly cut surfaces were covered with a substantially continuous film of the solution which then quickly diffuses into the material.

The so treated material is ready for drying. The constituents present in colloidal dispersion in the original plant material, but precipitated by the treatment, cannot migrate to the surface during the drying process, and thus do not interfere with evaporation of the water present. The drying rate is very substantially higher than with otherwise similar material not treated with coagulating agents. The formation of adhesive bonds between fibers and starch during drying is practically eliminated, and no starch is lost with the fibers during the subsequent removal of the latter.

In some instances, the rate of water removal through a surface of one to twelve square centimeters per cubic centimeter can be made rapid enough by the selection of suitable drying machinery that the coagulation step may be omitted without unduly reducing the quality of the ultimate product. A rapid drying rate is important under these conditions and can readily be maintained without need for interrupting the drying process by washing steps. A drying time of one hour is typical of preferred practice.

Drying is preferably terminated when the water content drops sufficiently to permit grinding of the plant material. This stage is generally reached at a maximum water content between 35 and 50 percent, and varies greatly with the type and origin of the plant material, and also between batches of the same plant material. Additional water is removed during or after a final grinding step so that flour ultimately produced may be a water content of typically 8 to 12 percent. It may then be separated into several fractions according to particle size and particle weight to remove fibers and particles of other organized plant elements such as hulls, and further to isolate the starch grains if so desired.

Treatment with dilute acids coagulates and inactivates oxidase and its precursors in the plant material, and fermentation of the product is avoided. Discoloration of the cut surfaces on contact with air, which otherwise occurs with beets and other plant materials mentioned above, is prevented. The cut and pre-dried plant product of the invention may safely be stored or transported without loss of quality. Grinding and ultimate processing may thus be carried out in a location far removed from the place at which the plant material was grown, harvested, and subjected to the coagulating treatment.

When cassava or manihot root is prepared for drying by coagulation of colloidal constituents by means of an acid coagulant, hydrogen cyanide present in the material as a glocoside is liberated by the acid, and is removed during drying. A common source of rejection of Manihot flour is thereby avoided.

The drying process is preferably controlled in such a manner that gelatinization of the starch and hydrolysis to dextrin are avoided. The temperature of the drying plant material therefore is preferably kept at a temperature not exceeding 48° C. The air in contact with the material during the drying process preferably is never hotter than 120° C. Vacuum drying and infrared drying are entirely suitable for the method of the invention and have advantages and shortcomings which are well understood. It is preferred to dry the treated plant material by passage through a convection oven in continuous flow.

The reader is referred to the following sources for information on features of applicable coagulation process other than those more specifically described herein:

(a) Coagulation by ultrasonic vibrations: J. Alexander, "Colloid Chemistry," (1944), vol. 5, page 337; Ullmann, vol. 10, pages 607–608.

(b) Coagulation by electric fields: A. B. Cottrell, Trans. A.I.M.M.E. 65 (1921) 430; Bergmann/G. Egloff "Emulsions and Foams," New York, 1948.

(c) General: Ullmann, vol. 6, page 509; vol. 9 (1957), page 313; vol. 7, (1956) pages 375 etc.; "Allgemeine und angewandte Kollidkunde" by Manegold, col. 1, pages 921 etc. (Verlag Strassenbau, Chemie und Technik, Heidelberg). The "Ullmann" referred to above is the well-known German standard handbook of industrial chemistry, latest edition available at this time.

Figure 2:
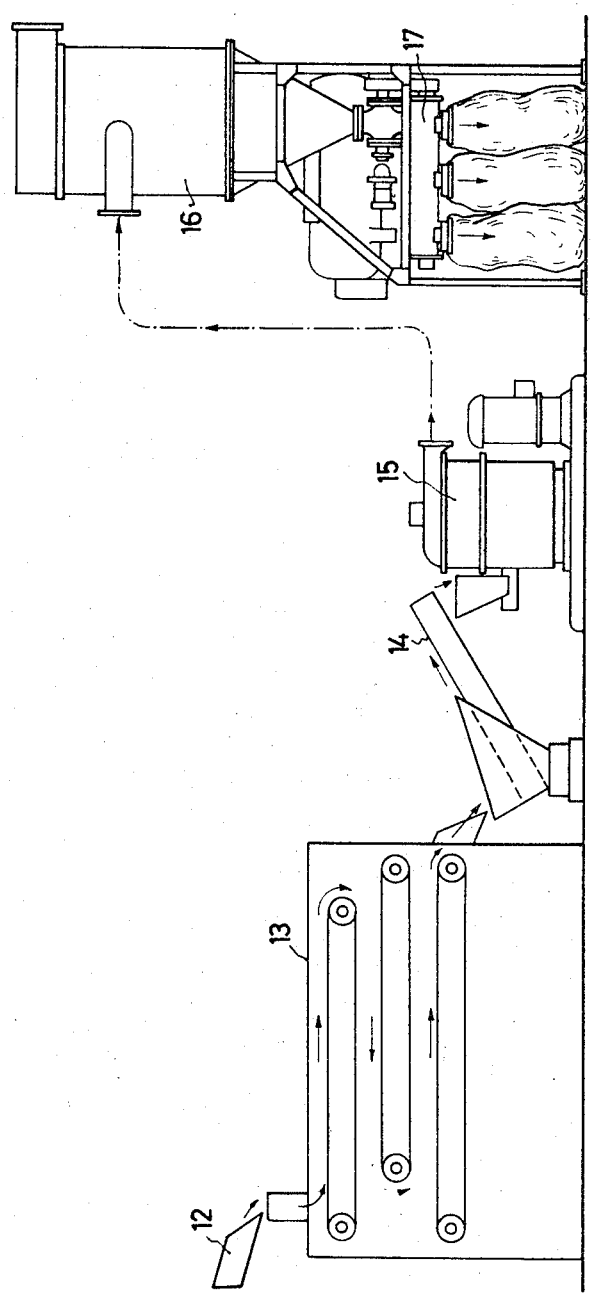
Figure 3:
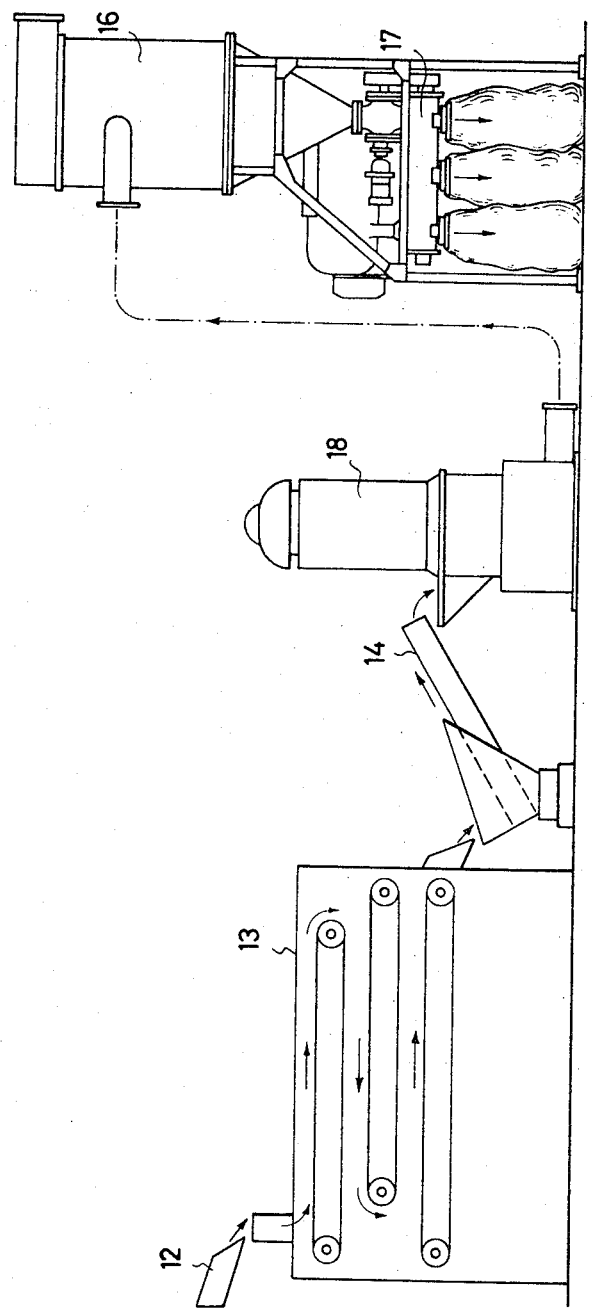

Preferred apparatus for carrying out the method of the invention is shown in the appended drawing in which:

FIGS. 1 and 2 respectively illustrate the two halves of a plant for carrying out the method of the invention, the view being generally in side elevation, and partly schematic; and FIG. 3 shows a modification of the plant portion shown in FIG. 2.

Referring now to the drawing in detail, and initially to FIGS. 1 and 2, there is seen an array of processing equipment, commercially available, and well known in itself. The several pieces of equipment are arranged for sequential treatment of a raw material which is fed to a coarse chopper 1. This is followed by a washing drum 2 equipped with a circulating pump unit 3. A horizontal conveyor belt 4 transfers the material discharged from the drum 2 to a bucket elevator 5 which drops into a dicing machine 6 of a type commonly employed in canning plants.

The diced material is received by a belt conveyor 7. It is exposed to spray from nozzles 10 while dropping from the dicing machine 6 to the conveyor 7, and while traveling on the conveyor. Spraying liquid is provided to the nozzles 10 from a tank 8 by a centrifugal pump 9. An elevator 11 and a chute 12 convey the sprayed goods to a drying oven 13 equipped with three endless belts which continuously moves the material through the oven in a meandering path and ultimately discharges it into yet another elevator 14 for feeding to a rotary grinder 15 such as the "Ultra-Rotor" of the Altenburger Machinen K.G. which is equipped with an internal air classification system which returns the coarse fraction of the output to the input, and adjustable for a maximum particle size of 2 to 15 mm., and the material is dried while being ground.

The comminuted material is separated from the air and most of the fibers in a cyclone 16 equipped with filters in its air discharge and sorted according to particle size in a classifier 17.

The plant partly illustrated in FIG. 3 differs from that shown in FIGS. 1 and 2 by replacement of the rotary grinder 15 by a hammer mill 18.

The use of the illustrated equipment will be described more specifically in the following examples, but it will be understood that the invention is not limited thereto.

EXAMPLE 1

100 kilograms cassava root were washed to remove superficial contaminants, and then fed to the chopper 1 of the plant shown in FIGS. 1 and 2. The roots were cut to pieces 8 to 12 inches long which were washed again with water in the drum 2. Rotten parts and remnants of woody stems were sorted out by hand on the conveyor 4, and the substantially clean roots were cut to approximately cubical pieces 0.8 to 1.0 cm. long in the dicer 6.

While dropping from the dicer to the conveyor belt 7, and while traveling on the conveyor, all faces of the cubes were sprayed from the nozzles 10 with fine droplets of an aqueous solution containing 0.3 percent by weight of a mixture of equal weights of formic and benzoic acid. The acid solution migrated into the interior of the cubes by diffusion from all sides and precipitated colloidal material within each cube by lowering the pH of the root material. The excess acid solution flowed back into the tank 8.

The treated material was dried in the oven 13 which was supplied with air heated to 120° C. in a non-illustrated conventional manner at such a rate that the temperature of the cubes never exceeded 48° C., and conversion of starch to dextrin was thereby avoided. The dried material left the oven 13 with a water content of 30% after a suitable dwell time in the oven 13.

The pre-dried material was then comminuted in the grinder 15 to a minimum particle size of 0.17 microns while its moisture content was further reduced to about 10% by contact with the stream of classifying air. After being separated from the conveying air and from much of the fibrous material in the filtering cyclone 16, the fine material was separated according to particle size into three fractions by the classifier 17, the fractions essentially consisting of fibers and of starch grains of two different size ranges.

The total amount of water evaporated was 50 kg. and the grinder output was 50 kg. Fibers weighing 10 kg. were separated from the flour which weighed 40 kilograms and essentially consisted of pure starch. The starch recovered amounted to 98 to 99% of the starch originally present in the root material.

Plant material which does not require coagulation is treated in the same manner but the pump 9 is not operated.

EXAMPLE 2

100 kg. potatoes were fed directly to the washing drum 2, sorted on the belt conveyor 4, and diced in the dicer 6 as described in Example 1. The approximately cubical pieces having sides 0.8 to 1 cm. long were sprayed from the nozzles 10 with water containing 0.4 percent by weight of a mixture of equal parts of sulfuric and phosphoric acid.

The acid treated material was transferred to the drying oven 13 shown in FIG. 3 in which it was dried to an ultimate water content of 10% by contact with a stream of hot air which was fed to the oven at 60° C. The dried material was fed to the hammer mill 18 in which it was comminuted to a minimum grain size of approximately 0.17 micron. Further treatment was as in Example 1, the fibers being separated from the starch mainly in the filtering cyclone 16, and the starch being classified according to grain size in the classifier 17 which also removed residual fibers.

The total amount of water evaporated was 78 kg. and the 22 kg. of ground material contained 4 kg. of fibers which were removed. The flour obtained weighed 18% of the original charge and contained 98 to 99% of the starch originally present in the potatoes.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A method of recovering a product mainly consisting of starch from a peel-bearing plant material, mainly consisting of unitary bodies having a surface area-to-volume ratio substantially smaller than one square centimeter per cubic centimeter, said bodies essentially consisting of approximately 3 to 48 percent of said starch, 35 to 95 percent water, constituents colloidally dispersed in said water to form therewith a plant juice, and fibrous constituents, which method comprises:
    (a) cutting said bodies of peel-bearing plant material into pieces having a surface area-to-volume ratio between twelve square centimeters and one square centimeter per cubic centimeter;
    (b) rapidly drying the material of said pieces to an ultimate water content of approximately 8 to 12 percent;
    (c) comminuting said pieces to a particle size substantially between 0.17 micron and 15 millimeters after they are at least partly dried toward said ultimate water content, whereby said starch is set free in the form of grains; and
    (d) mechanically separating the dried and comminuted pieces according to size into two fractions, repectively containing substantially no starch and containing substantially the entire starch of said plant material.

2. A method as set forth in claim 1, wherein said colloidally dispersed constituents of said plant juice are coagulated in the freshly cut pieces of said plant material prior to said drying.

3. A method as set forth in claim 2, wherein said colloidally dispersed constituents are coagulated by contacting the freshly cut surfaces of said pieces with an aqueous solution of an electrolyte, until said electrolyte migrates into the interior of said pieces.

4. A method as set forth in claim 3, wherein said electrolyte is an acid, and the concentration of said acid is sufficient to make the pH of said interior approximately 5.

5. A method as set forth in claim 3, wherein said electrolyte is an acid, and the concentration of said acid in said aqueous solution is substantially between 0.2 to 0.5 percent by weight.

6. A method as set forth in claim 3, wherein said electrolyte is an acid selected from the group consisting of benzoic, formic, lactic, sulfuric, and phosphoric acids.

7. A method as set forth in claim 2, wherein said pieces are held at a temperature not substantially exceeding 48° C. during said drying.

8. A method as set forth in claim 2, wherein said pieces are dried to said ultimate water content in a single continuous operation.

9. A method as set forth in claim 2, wherein said plant material is selected from the group of plants consisting of *Manihot utilissima*, Jerusalem artichoke, sweet potato, potato, yam, yuca, arrowroot, Colocasia, turnip, beet, carrot, and banana.

10. A method as set forth in claim 2, wherein said pieces are pre-dried to a water content of approximately 30 percent prior to said comminuting, and are dried to said ultimate water content during said comminuting.

11. A method as set forth in claim 10, wherein said pieces are pre-dried by contact in continuous flow with a stream of hot air having a temperature not substantially exceeding 120° C.

12. A method as set forth in claim 2, wherein said pieces are substantially cubical when freshly cut from said bodies, and have an approximate length of 0.5 to 2 centimeters.

13. A method as set forth in claim 12, wherein said cubical pieces have an approximate length of 0.8 to 1 centimeter.

References Cited

UNITED STATES PATENTS

| 1,224,951 | 5/1917 | Moore | 127—66 |
| 3,079,283 | 2/1963 | Dreissen | 127—66 X |

OTHER REFERENCES

Radley: Starch and Its Derivatives, vol. 2, chapter 1, John Wiley and Sons, Inc., New York (1954).

MORRIS O. WOLK, *Primary Examiner.*

S. MARANTZ, *Assistant Examiner.*

U.S. Cl. X.R.

127—24, 66